US007561681B2

(12) United States Patent
Booth et al.

(10) Patent No.: US 7,561,681 B2
(45) Date of Patent: Jul. 14, 2009

(54) INTERACTIVE SYSTEM FOR MANAGING AND REMOTELY CONNECTING CUSTOMER UTILITY LOADS

(75) Inventors: Derek Booth, Suwanee, GA (US); Ivo Steklac, Highlands Ranch, CO (US)

(73) Assignee: Cellnet Innovations, Inc., Alpharetta, GA (US)

( * ) Notice: Subject to any disclaimer, the term of this patent is extended or adjusted under 35 U.S.C. 154(b) by 676 days.

(21) Appl. No.: 11/104,155

(22) Filed: Apr. 12, 2005

(65) Prior Publication Data

US 2005/0240315 A1 Oct. 27, 2005

Related U.S. Application Data

(63) Continuation of application No. 09/966,326, filed on Sep. 28, 2001, now abandoned.

(51) Int. Cl.
*H04M 11/00* (2006.01)
*G08G 19/16* (2006.01)

(52) U.S. Cl. ............................. 379/106.03; 379/106.01; 379/102.01; 379/102.02

(58) Field of Classification Search ................................
379/102.01–102.05, 106.01, 106.03, 106.08;
340/870.01, 870.02; 700/291–295; 702/61–62;
705/51–52, 63; 455/557, 66.1
See application file for complete search history.

(56) References Cited

U.S. PATENT DOCUMENTS 5,572,438 A * 11/1996 Ehlers et al. ................. 700/295

| 6,088,659 | A | * | 7/2000 | Kelley et al. | .................. 702/62 |
| 6,900,738 | B2 | * | 5/2005 | Crichlow | ............... 340/870.02 |
| 2002/0193144 | A1 | * | 12/2002 | Belski et al. | ................. 455/557 |

* cited by examiner

*Primary Examiner*—Melur Ramakrishnaiah
(74) *Attorney, Agent, or Firm*—Kilpatrick Stockton LLP

(57) ABSTRACT

An interactive system for managing and remotely monitoring and effecting the connection status of a customer utility load network is disclosed. Preferred embodiments of the interactive system are utilized for customer loads that correspond to the distribution of electrical energy. The interactive system is preferably provided through a web-based application that offers a plurality of selectable services to a user. Security information is preferably required for a user to gain access to the system. Services provided may comprise a read service for providing metered customer utility data, a usage and/or demand notification service for alarming a user when utility usage and/or demand exceeds a defined threshold amount, and/or a connection service for setting a utility load as either connected or disconnected. A control system is preferably provided in conjunction with the web-based application to interface the application to other components involved in the interactive system. Such a control system preferably comprises at least a system controller for managing all nodes in the utility network and a database system for storing meter data and other system-related information. A wireless communications network is established for relaying information from the system controller and web-based utility application to any utility meters or other components linked to the system.

23 Claims, 6 Drawing Sheets

INTERACTIVE SYSTEM FOR MANAGING AND REMOTELY CONNECTING CUSTOMER UTILITY LOADS

CROSS-REFERENCE TO RELATED APPLICATIONS

The present application is a continuation of application Ser. No. 09/966,326 filed Sep. 28, 2001 now abandoned.

BACKGROUND OF THE INVENTION

The present invention generally concerns an interactive system for managing a customer utility load, and more particularly, concerns a web-based application utilized in conjunction with meter hardware and a communications network for monitoring information corresponding to a customer utility load. For selected utilities, the subject web-based application also provides a service for remotely altering the connection status of customer utility loads.

Several types of customer utilities are available at residential and commercial properties worldwide. Such properties and other locations may typically be supplied with selected utilities (i.e., products, or commodities) such as water, gas, electricity, cable service, telecommunications, and others. When a selected utility is provided to a customer load, there is typically some sort of metering hardware that is available for monitoring the amount of product that is provided to a specific customer load. Utility meters are typically characterized by some sort of metrology hardware that measures this consumption information and provides other information about the utility.

Many utility meters also include communications elements that provide a signal interface between the metrology hardware of a meter and other devices. Known communications components in utility meters include radio frequency (RF) communications devices that can transmit and receive signaled information between the meter and other locations. A meter with such wireless communications capabilities may provide an arrangement for remotely reading consumption data and other information from the meter without a utility serviceperson having to directly access the utility meter. A remote communications element within an appropriate range to the meter and corresponding RF component can request and receive desired information. This feature is known to be particularly useful for remotely gathering billing data corresponding to customer utility loads.

Despite advances in versatile communications and other features of utility meters, there are still many instances where a utility serviceperson may be required to directly access a utility meter in the field. Such instances may include, without limitation, a need to connect or disconnect service to a customer utility load, a need to fix broken or malfunctioning meter components, or a need to access other particular meter functions or information. Service personnel must monitor these needs and others, travel to particular customer utility locations, and often spend valuable time to service the meter. The need to perform such hands-on duties may thus often be characterized as a time-consuming and inefficient process.

There are many other factors that affect the ability of utility personnel to access a meter in the field and to efficiently service the device. Utility meters may be located in high crime areas or other areas that may not be readily accessible, making even simple meter servicing an inconvenience or even a danger. Certain customers may be prone to delinquency, thus increasing the frequency of service visits to a utility load for connecting, disconnecting, or reconnecting the service. Numerous service visits may also be required at locations with high occupancy turnover, such as apartment complexes or short-term housing locations. Meter tampering, malfunctioning of meter components, and changes in utility billing status are among many other reasons that utility service personnel may be required to spend valuable field time servicing a meter.

It is thus desired to provide features and methods that would reduce and optimize the amount of time meter service personnel spend in the field. While various systems and arrangements have been developed to advance and simplify selected aspects in the field of utility meters, no one design has emerged that generally encompasses all of the desired characteristics as hereafter presented in accordance with the subject technology.

BRIEF SUMMARY OF THE INVENTION

In view of the discussed drawbacks and shortcomings encountered in the field of utility metering, an improved system for monitoring the status of customer utility loads has been developed. Thus, broadly speaking, a general object of the present invention is to provide an improved interactive system for remotely monitoring and establishing the status of a customer utility load.

It is another principal object of the present subject matter to provide a remote system for monitoring and controlling a customer utility, such as gas, water, electricity, cable service, telecommunications or other utilities, via a web-based application.

It is yet another principal object of the disclosed technology to provide a remote system for interacting with a customer utility load, wherein physical components of the system include an internet-based platform, a fixed radio network with a plurality of communications nodes, a utility meter and other hardware.

It is another object of the present subject matter to provide a remote system that may be utilized to either physically or virtually (re)connect or disconnect the operation of a customer utility load.

It is yet another object of the subject system and procedures to provide meter data reports based on the monitored activity of a utility load.

It is a further object of the present subject matter to provide a remote system for connecting a customer utility load, wherein rapid data reads and other safeguards are employed to ensure a safe and effective load connection.

A still further object of the present technology is to provide a remote system for monitoring a customer utility load and for quickly alarming a system user of any discrepancies between the load status or consumption and predefined utility rules. Such quick alarm is preferably sent via e-mail or other form of communications.

Yet another object of the disclosed technology is to provide a system that monitors a utility load in a way that offers improved economy, efficiency, security and reliability over existing utility service applications.

A still further object of the subject technology is to provide a web-based application for monitoring and controlling a customer utility load, wherein users of selected services offered by the web-based application could comprise a number of different entities. Examples of such entities that may use aspects of the utility application include end consumers, utility companies, service providers, utility management agencies, property managers of apartment complexes or other properties, caretakers or guardians of certain individuals, or financial "co-signers."

An additional object of the present subject matter is to provide a system for remotely managing a plurality of utility loads such that the amount of time a meter field technician spends servicing a load and corresponding metering equipment is greatly reduced.

Additional objects and advantages of the present subject matter are set forth in, or will be apparent to, those of ordinary skill in the art from, the detailed description herein. Also, it should be further appreciated that modifications and variations to the specifically illustrated, referred and discussed features and steps hereof may be practiced in various embodiments and uses of the invention without departing from the spirit and scope thereof, by virtue of present reference thereto. Such variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of this invention may include various combinations or configurations of presently disclosed features or elements, or their equivalents (including combinations of features, parts, or steps or configurations thereof not expressly shown in the figures or stated in the detailed description of such figures). One exemplary such embodiment of the present subject matter relates to an interactive system for managing a customer utility load. Such an interactive system may comprise a plurality of utility meters, a web-based application, a communications network, and a control network.

More preferably, the utility meters are provided for monitoring the distribution of a utility product at respective customer utility end-point devices. Each utility meter also preferably includes a radio frequency (RF) communications device for relaying selected meter information. The meter and corresponding RF device is then preferably connected to a system controller via a communications network. The communications network can be modeled as a plurality of nodes distributed at selected locations in the interactive system. The system controller may be considered part of the control network, which preferably links the communications network to the web-based application. The web-based application preferably offers a plurality of selectable services to a user, wherein the services preferably relate to some aspect of the utility meters and product distribution at varied customer loads.

In other exemplary embodiments of such an interactive system, the communications network comprises a plurality of cell masters that are linked to the system controller. Each cell master is linked to a plurality of microcell controllers, and each of those is in turn linked to a respective plurality of utility meters. It may be preferred that the control network further comprises various databases for storing metering information obtained from selected utility meters and other information about the interactive system. The web-based utility application is preferably hosted in an appropriate platform, an example of which could be an internet website. The application's selectable services preferably relate to product distribution and corresponding data at selected customer utility loads.

Another present exemplary embodiment of the subject technology is a remote system for disconnecting and/or reconnecting the flow of electricity at a customer utility load. The remote system may comprise a metering system, a web-based application, a connection device, and an RF communications device. The metering system preferably corresponds to the customer utility load, such that the metering system monitors the load and provides related consumption data. The web-based application provides a selectable option to signal the desired connection status of the utility load. The desired connection status toggled by the connection device is preferably characterized as either connected or disconnected. The RF communications device that is provided in conjunction with the metering system preferably relays selected information between the metering system and the web-based application. If the flow of electricity is (re)connected to a customer utility load, a series of rapid data reads are preferably performed to ensure that excessive instantaneous power consumption does not pose a threat to the metering system.

Yet another exemplary embodiment of the present subject matter corresponds to a web-based utility application offering selectable services for a customer utility load. Such selectable services preferably comprise a read service that remotely reads metered data corresponding to a selected customer utility load and has the ability to display data reports corresponding to the metered data. A usage notification service is also preferably provided by the utility application. The usage notification service involves a user inputting a threshold amount of utility consumption and a subsequent generation of a consumption alert to notify the user when the load exceeds the inputted threshold level. The web-based application preferably incorporates security measures, as access to the web-based application is preferably effected by a user inputting identification information and corresponding password information. In other exemplary embodiments of the subject utility application, a connection application may also be provided. Such a connection application may preferably be utilized to effect the connection status of a customer utility load such that the load is either connected or disconnected. In the context of the present subject matter, it will be appreciated that effecting the connection status of a customer utility load can encompass multiple facets of connection. The disclosed technology can effect connection status by either physically or virtually disconnecting or reconnecting a customer utility load.

Still further exemplary embodiments of the presently disclosed technology relate to a method for effecting the connection status of a customer utility load via a web-based application. The method may comprise multiple steps, including providing access information, performing remote reads of a utility meter, transmitting a connection signal, and setting a connection device or switch element. The access information is preferably inputted by a system user and required for proper access to the web-based application. A first remote read may typically be performed to determine the initial connection status of a customer utility load. A connection signal can then be transmitted from a main control station to an RF receiver provided at the utility meter. A switch element also located at the utility meter is then preferably set to a desired position upon receipt of the connection signal. After the switch is set, it is preferred that a second remote read is performed to verify the newly updated connection status of the utility load.

Yet another exemplary embodiment of the disclosed technology relates to a method for remotely connecting a customer utility load via a web-based utility application. Such exemplary method preferably comprises the steps of accepting a load connection request, performing a first remote read of a utility meter associated with the customer utility load, transmitting a connection signal, performing a series of rapid reads, and conditionally transmitting a disconnection signal. A user of the web-based application requests load connection via the web-based application, and the first remote read then preferably verifies an initial disconnected status of the utility load. The connection signal is preferably transmitted from a main control station to a communications device provided at the utility meter. After receiving the connection signal, a connection element is then preferably toggled to connected status. The series of rapid remote reads is preferably performed to verify final connection status of the customer utility load and to monitor the instantaneous energy consumption of the load. If the instantaneous energy consumption is above a predefined threshold, a disconnection signal is then sent to toggle the connection element to disconnected status.

Additional embodiments of the present subject matter, not necessarily expressed in this summarized section, may include and incorporate various combinations of aspects of features, components, or steps referenced in the summarized objectives above, and/or other features, components, or steps as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
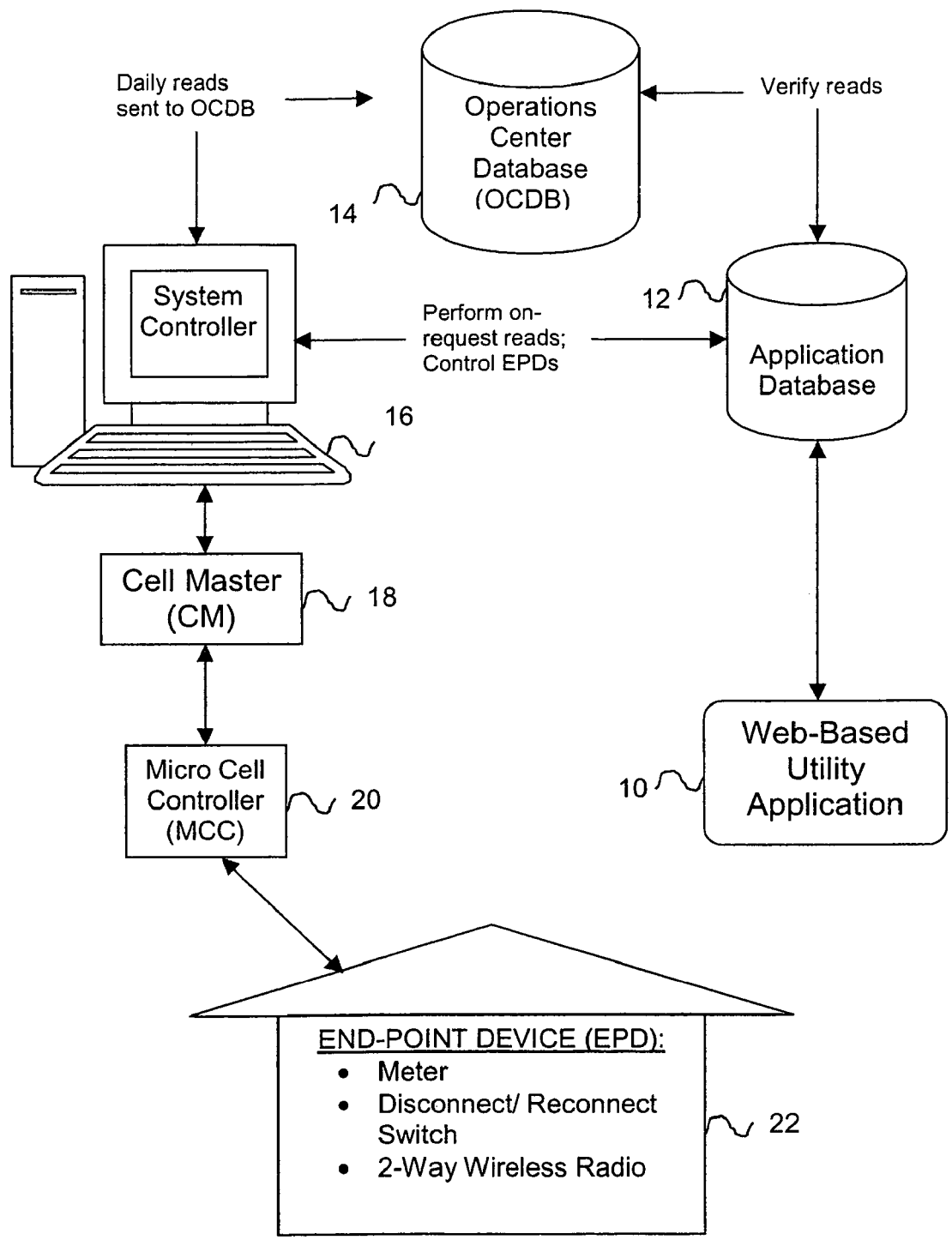
FIG. 1 is a block diagram representation of physical components for an exemplary interactive system for managing customer utility loads in accordance with the present subject matter.

Repeat use of reference characters throughout the present specification and appended drawings is intended to represent same or analogous features or elements of the invention.

DETAILED DESCRIPTION OF THE DRAWINGS

As discussed in the Brief Summary of the Invention section, the present subject matter is particularly concerned with an interactive system for remotely monitoring and establishing the connection status of a customer utility load.

Such an interactive system is preferably provided through the internet or other web-based environment and selectable services are available from the interactive application. Security information is preferably required for a user to gain access to the system. Examples of entities that may use aspects of the interactive utility application include end consumers, utility companies, service providers, utility management agencies, property managers of apartment complexes or other properties, caretakers or guardians of certain individuals, or financial "co-signers." The actual user of selected system components often depends on the circumstances surrounding use of the application.

Services provided by the system relate to the operation of customer utility loads and may include such specific services as a read service for providing metered customer utility data, a usage notification service for alarming a user when utility usage exceeds some threshold, and/or a connection service for effecting the connection status of a utility load as either connected or disconnected. In the context of the present subject matter, it will be appreciated that effecting the connection status of a customer utility load can encompass multiple connection features. The disclosed technology can effect connection status by either physically or virtually disconnecting or reconnecting a customer utility load.

There are several physical system components that typically are provided in conjunction with the web-based application for many of the remote services to fully function. A control system must be provided to interface the web-based application to other components of the system. Such a control system preferably comprises at least a system controller for managing all nodes in the utility network and a database system for storing meter data and other system-related information. A communications network must also be established for relaying information from the system controller and web-based utility application to any utility meters or other components linked to the system.

Figure 3:
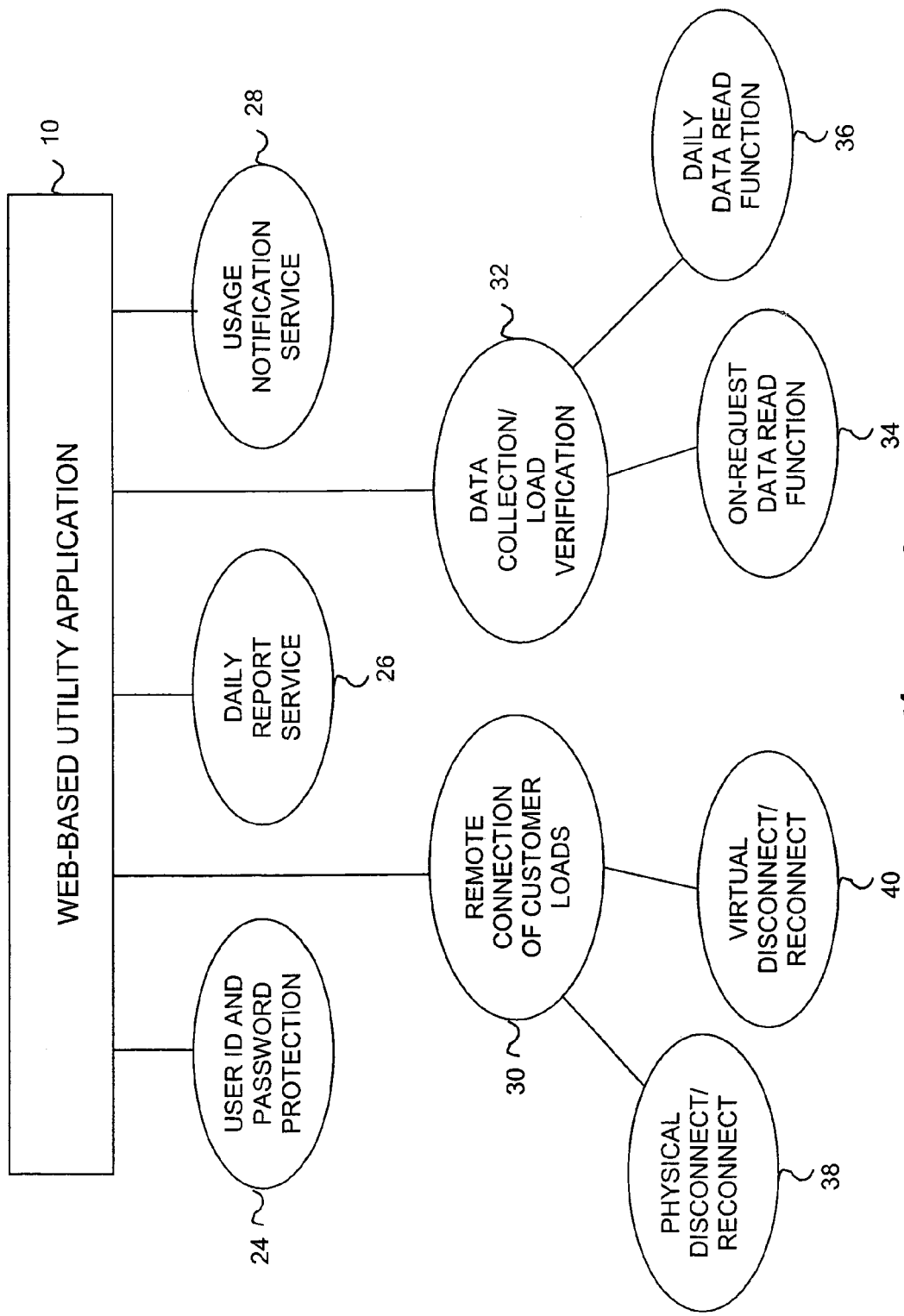
FIG. 3 illustrates exemplary services and features of a remote utility service and system in accordance with the presently disclosed technology.
Figure 4A:
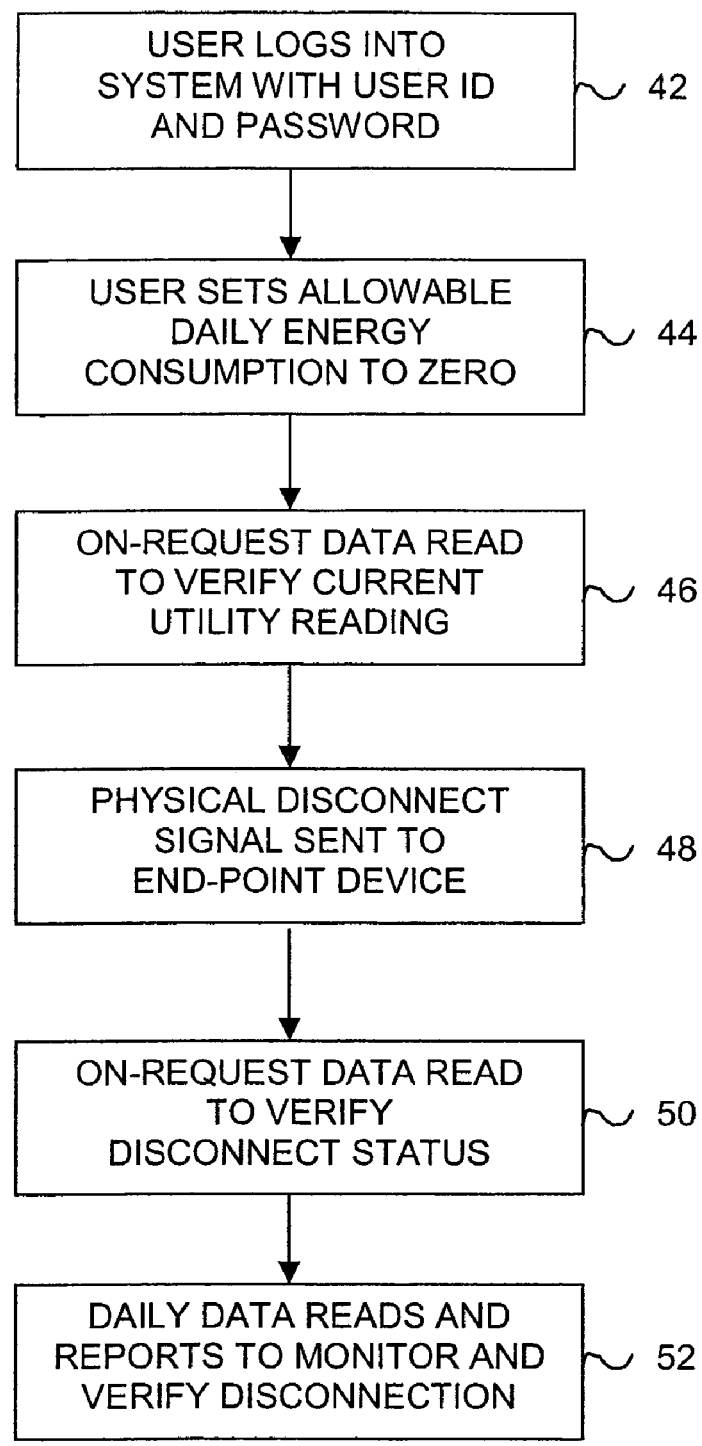
FIG. 4A displays a flow chart of an exemplary physical disconnection process for use in accordance with selected embodiments of the presently disclosed interactive utility system.
Figure 4B:
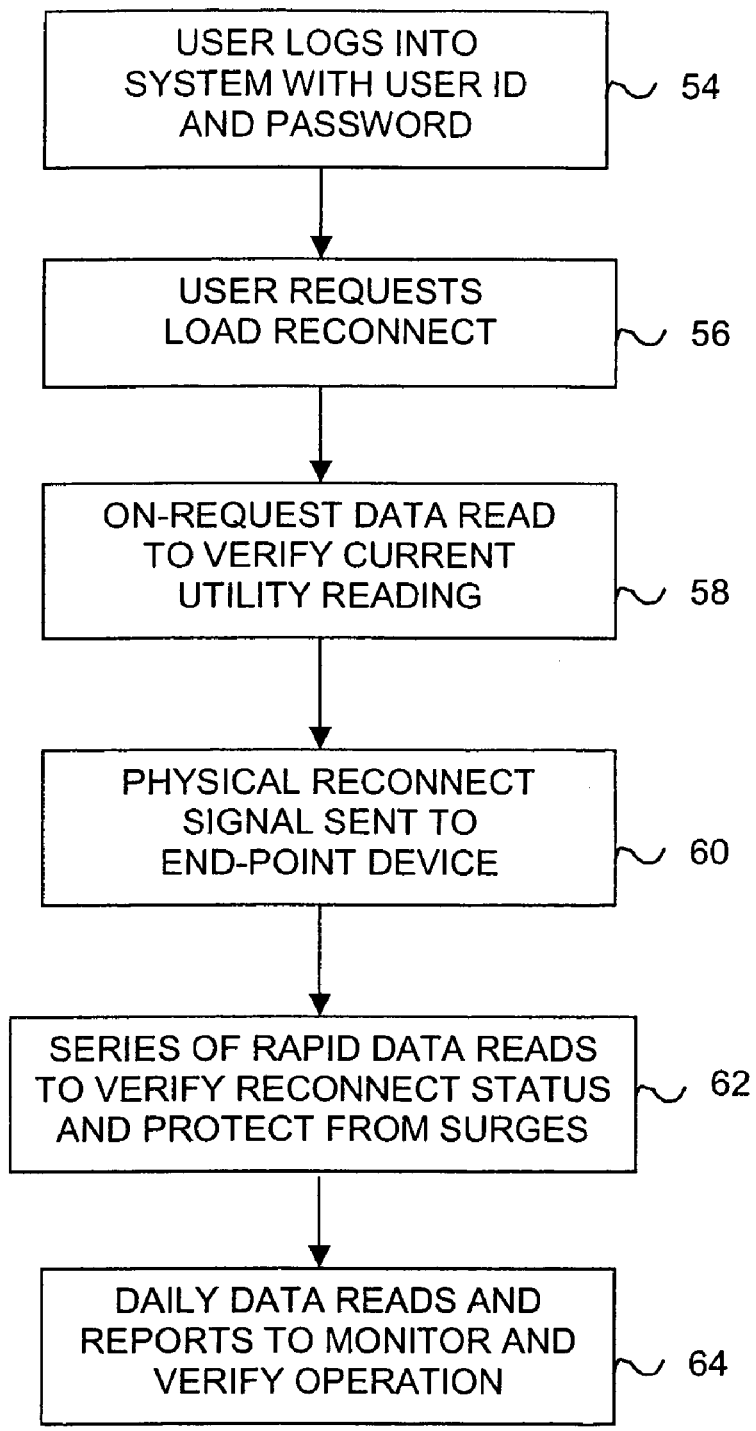
FIG. 4B displays a flow chart of an exemplary physical reconnection process for use in accordance with selected embodiments of the presently disclosed interactive utility system.
Figure 5:
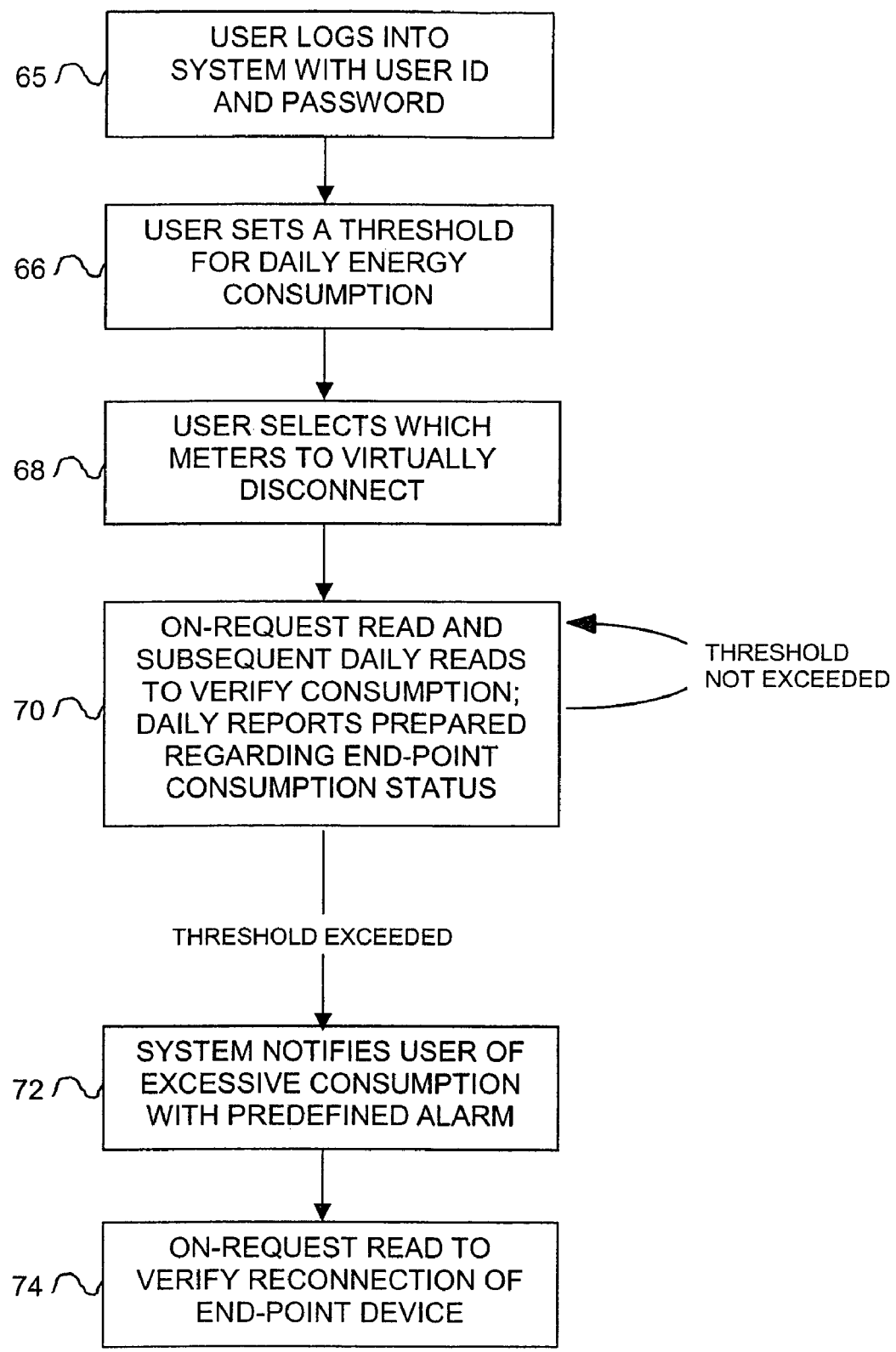
FIG. 5 displays a flow chart of an exemplary virtual connection service provided in accordance with selected embodiments of the subject interactive utility system.

The interactive utility system of the disclosed subject matter is hereafter presented in the context of three general aspects of the system that contribute to the exemplary embodiments of the invention. The first aspect of the disclosed technology corresponds to the physical components of the system, and this is discussed with reference to FIGS. 1 and 2. A second aspect directs focus to the web-based application and selectable services provided to a user in accordance with such an application. This is discussed in more detail relative to FIG. 3. Finally, a third aspect of the present subject matter relates to a more detailed description of exemplary processes corresponding to selected of the available services of the interactive utility system. FIGS. 4A, 4B and 5 are each discussed with reference to such exemplary processes.

It should be noted that each of the exemplary embodiments presented and discussed herein should not insinuate limitations of the present subject matter. Features illustrated or described as part of one embodiment may be used in combination with aspects of another embodiment to yield yet further embodiments. Additionally, certain features may be interchanged with similar devices or features not expressly mentioned which perform the same or similar function. Similarly, certain process steps may be interchanged or employed in combination with other steps to yield additional exemplary embodiments of an interactive utility system.

Reference will now be made in detail to the presently preferred embodiments of the subject interactive utility system. Referring now to the drawings, FIG. 1 provides a block diagram of exemplary physical components in conjunction with an interactive utility system in accordance with the disclosed technology. A service application 10 provides various services related to selected customer utility loads. Utility application 10 is preferably hosted within a web-based platform and provides the utility with remote access to and control over its metering equipment. An example of such a web-based platform for hosting application 10 is an interactive utility website.

The application provides services that allow a user to remotely monitor and control a selected end-point device 22. An end-point device 22 typically corresponds to a utility meter that monitors the distribution of a utility product such as water, gas, electricity, cable service, telecommunications or other measurable product or commodity. The utility meter preferably includes typical metering components as required for functional operation of the utility meter.

The end-point device 22 also preferably includes a communications device that is capable of transmitting and receiving radio frequency (RF) signals. The communications hardware and other metrology hardware is all preferably connected on a common signal bus such that selected components of the meter can communicate internally and interact amongst each other. Such a two-way wireless radio feature in conjunction with a metering system enables EPD 22 to communicate and relay information in a remote fashion. Selected utility meters may also include a connection device, such as a switch, that essentially establishes the connection status of EPD 22 and its corresponding utility load. Such a switch may be positioned in either connected mode, wherein the customer load is receiving a given utility product, or disconnected mode, wherein product flow to a customer load is terminated. An example of such a connect/disconnect switch is a circuit breaker (possibly rated at 200 Amps) or other current limiting device. It is possible to switch such a connect/disconnect switch to disconnected mode, while including other load limiting switches that would allow smaller loads (for example, those rated at about 60 Amps) to still maintain connected status. The main connection device is preferably located on the load side of a utility meter, thereby enabling the meter to still be energized even if the load is disconnected from the utility source.

Additional specific details corresponding to the physical arrangement and functionality of a metering device are not the focus of the present subject matter and are thus not presented herein. Moreover, such details should be known and appreciated by one of ordinary skill in the art of utility meters. In preferred embodiments of the subject technology, the metering device is used to monitor the distribution of electrical energy. It will thus be appreciated that in such preferred embodiments, the electric utility meters may have either electro-mechanical or completely electronic components or a hybrid of the two types. Specific components of such electric utility meters essential for operation of selected features of the presently disclosed system include the aforementioned communications device and switch element.

A control network is preferably linked to the web-based application 10 to interface and manage aspects of the application. It will be appreciated in the exemplary embodiments presented herein that a control network comprises a unit that manages the EPDs 22 and also databases as needed for storage of system information. An example of such a control network, as represented in FIG. 1, comprises application database 12, operations center database 14, and system controller 16.

Application database 12 preferably facilitates the management of web activity at application 10. Features provided by the application database 12 include storing user IDs and passwords required for access to the utility application 10, storing a list of members that are available to access the service, and storing threshold data provided for selected EPDs 22. The application database also contributes to system processes including performing on-request and daily reads of meter data to determine usage information and also signaling usage notification alarms for problem sites.

Operations center database (OCDB) 14 stores vital information related to the utility network. Information about the layout and configuration of various EPDs 22 and other communication nodes (for example, system controller 16, cell masters 18, and microcell controllers 20) in the system are preferably stored in OCDB 14. Additional particular information stored at this location may correspond to the communication among nodes in the system, as well as intermediate meter data for providing to utility application 10.

Figure 2:
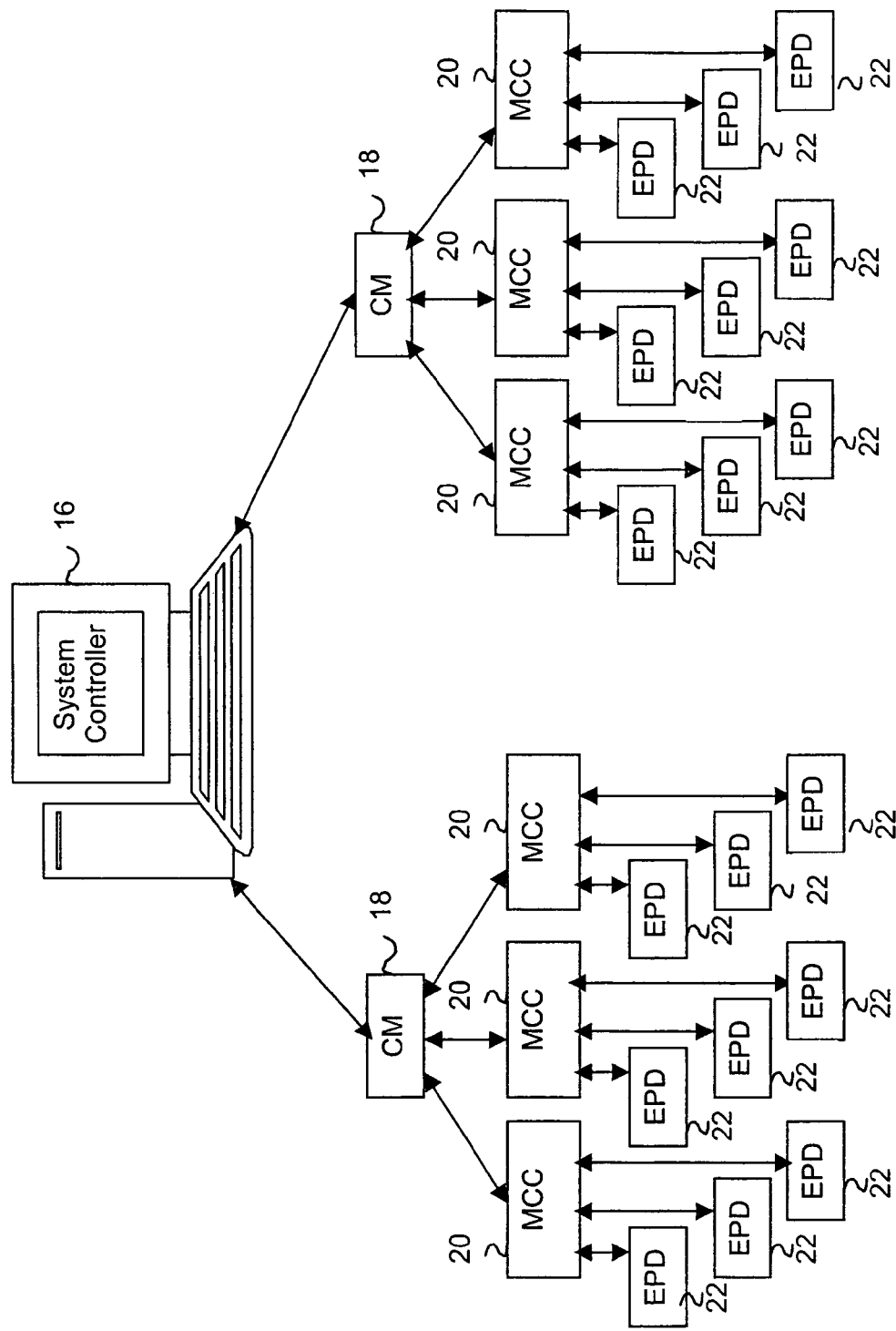
FIG. 2 is a diagram of an exemplary communications network as utilized in conjunction with an interactive utility system in accordance with the present subject matter.

System controller 16 is interfaced to both OCDB 14 and application database 12, and is the physical system component that essentially controls all the other components in the utility network. System controller 16 is also the central node in a communications network that flows through cell master components 18, micro cell controllers 20, and ultimately to the end-point devices 22. This communications network preferably corresponds to a collection of nodes that can relay wireless information among each other. A more appropriate representation of such an exemplary communications network is provided in FIG. 2. System controller 16 controls and communicates with a plurality of cell masters (CMs) 18, which in turn communicate with a plurality of micro cell controllers (MCCs) 20, which in turn communicate with a plurality of end-point devices (EPDs) 22. The number of devices 18, 20, and 22 that are displayed in FIG. 2 is only presented as an example. In actuality, there may preferably be many more nodal components in the network. For instance, the total number of EPDs 22 in the system may typically correspond to the number of utility meters in a designated service area. MCCs 20 and CMs 18 are positioned within a given proximity to a certain number of EPDs to facilitate the communication chain among components.

The actual communication among system components is preferably by way of wireless radio frequency (RF) signals. However, even in such "wireless" embodiments, the communications line among system components need not also be wireless. It should be appreciated that other forms of communications links may be utilized in accordance with the subject technology, such as hard-wired networks of coaxial cable, optical fiber, or other transmission medium. Each node is preferably capable of two-way communication, and thus able to both transmit and receive signaled information from other communication nodes in the utility network. The arrangement of physical components and interaction thereof contributes to proper operation of the subject interactive utility system. However, much of the operation of the system is viewed merely in terms of the end-points of the utility network. Input to the web-based utility application 10 at one end-point affects the output and information of a selected metering device at another end point.

Reference will now be directed to the web-based utility application 10 and selectable services offered in accordance with the present subject matter. FIG. 3 presents several selectable services and related functions that are available in an exemplary embodiment of utility application 10. In preferred embodiments, UDL users that have not been granted access to a particular feature of the utility application 10 will not be aware of that feature's presence in the website portal. In this way, utility application 10 can employ a single coherent application space while still maintaining security over selected features of the system.

Security measures for selected services and features of the web-based utility application 10 are provided by security protection feature 24. To ensure the utmost security to a customer's utility load, proper and strict use of user IDs and passwords is incorporated into the subject technology. Thus, to obtain access to selected utility services, an identification element and a corresponding password element that match with access elements stored in the application database 12 must be inputted to the system.

Another available feature of the utility system is a daily report service 26, which provides information to a user about the status of a particular endpoint or endpoints 22 in a utility network. A report that offers information about a particular endpoint preferably offers information about both the meter and the connect/disconnect switch or device at that meter. The daily status report service 26 is intended primarily to benefit the utility customer, and thus may also show the status of all recent switch toggle transactions and energy consumption. This service may be particularly beneficial within the context of other services available to the user, as will be apparent throughout the remainder of the specification.

Yet another service available through the web-based application 10 is a usage notification function 28. This feature generates an alarm notification upon the load exceeding a user-defined energy consumption threshold or upon the triggering of other user-defined events or problems in accordance with a selected utility load. The alarm notification may correspond to sending an e-mail or page, providing a telephone call or service visit, or other form of communication to alert a customer of the corresponding occurrence. After such notification, a utility customer preferably has the ability to perform a remote read through web-based application 10 of a selected meter in order to confirm that an energy threshold has been exceeded.

Utility application 10 also preferably allows for daily monitoring of metering devices 22 that are both connected and disconnected and records the corresponding consumption in web-based application 10. This feature is described as part of the data collection/load verification feature 32. Once data from a metering device is obtained, utility application 10 preferably has the ability to compare data corresponding to the daily or amassed monthly consumption to a user-defined energy consumption threshold to determine if that threshold has been exceeded. It may often be the case that after this data comparison takes place, the alarm notification function is implemented to alert a customer accordingly. The data collection feature 32 is also utilized to generate endpoint status reports for each connected and disconnected load in the system.

The data collection aspect of feature 32 can be characterized as either an on-request read 34 or a daily read 36 of end-point data. Daily reads 36 are incorporated with aspects of the daily report service 26 and the usage notification service 28, while on-request reads are incorporated with aspects of the remote connection service 30, including both the physical connection service 38 and the virtual connection service 40. Should the alarm threshold of the usage notification service 28 trigger upon energy consumption exceeding a specified threshold amount, an on-request read is preferably performed to verify that the meter has effectively re-connected. In the virtual disconnect mode effected by service 40, daily reads are used to ensure that energy consumption is below a preset threshold point. When the consumption exceeds this threshold, meter readings and load consumption data is captured for inclusion in daily reports. A customer can then use this information to determine when excess fees or rates will be charged for consumption in excess of the threshold. The information obtained in accordance with such data collection may also be utilized to indicate fraud, theft of service, or potential use of a property by squatters, trespassers, or the like. There may be many other useful applications for the data collected by the read functions 34 and 36 of the subject utility application. Further applications of the data obtained in accordance with services of the disclosed technology should not be precluded from incorporation within the scope and spirit of the present subject matter.

Similar to the data collection performed by feature 32, daily monitoring and verification of physically disconnected loads in the utility network also preferably occur. Performing a daily read verifies that the connection device is still in the state it was last toggled, and that the energy consumption is commensurate with this switch position. Thus, a daily read of disconnected loads similarly checks for potential occurrences such as fraud, theft, and switch malfunction. Similarly, reads are performed after a physical disconnect or reconnect has been performed in accordance with services of utility application 10 to verify that the switching function operated in a proper fashion.

Yet another feature of the present subject matter and subject utility application 10 deals with the remote connection of customer loads 30. Exemplary embodiments of the present technology can preferably incorporate both a service for physical connection or disconnection 38 and a service for virtual connection or disconnection 40. Each of these exemplary connection services incorporates selected aspects of the other services and features available to a utility customer.

The physical connection feature 38 physically toggles the connection device (switch) associated with a metering device. This application is preferably available only for electric utility loads. The environment of other utility loads such as gas and water may make it hazardous to perform any such remote connection operation. Other situations which would not be conducive to such remote connection or disconnection include having a utility meter devoid of some non-volatile power source that keeps it energized even after the load is disconnected.

Such a remote physical connection service 38 may be utilized when a utility company needs to disconnect or reconnect a utility customer's load. Such process may occur due to nonpayment of a utility bill, a change in residential occupancy, or simply to aid a utility company in its load accessibility and overall operational efficiency or maintenance/repair operations. The physical service 38 may also be used in a load limiting fashion. For instance, a user may specify that a maximum level of 20 A is not to be exceeded for a specific heating load. For loads in excess of 20 A, the remote utility system can perform a remote disconnect.

There are several steps that preferably occur in remote physical disconnection 38' of a customer utility load, and an exemplary such process is hereafter discussed with relation to FIG. 4A. A first exemplary step 42 of physical disconnection process 38' involves the user logging into the utility application using his or her user identification information and corresponding password information. Upon proper input of this or other access information, a user can then set the allowable daily energy usage or demand in step 44. For a physical disconnect to occur, the user sets the allowable energy usage to zero, thereby requesting that the selected load be disconnected. The utility network then performs an on-request read 34 of the metering equipment monitoring the selected load to verify the current load reading. The metered information is then subsequently stored in an appropriate system database. The next step 48 corresponds to the actual disconnection, and a disconnect signal is sent to the end-point device at the selected utility load. The signal is sent via the web-based system, through the radio communications network and to the meter and corresponding two-way radio device. After the physical disconnection signal is remotely sent at step 48, another on-request read 34 is performed to again monitor the selected load and verify that it was indeed disconnected. After the disconnection is established, daily reads 36 are performed of the metering equipment to monitor the load and verify that the load remains inactive. Daily reports are also generated based on the information obtained from the daily reads to provide general feedback regarding end-point load activity.

A similar procedure is followed for a physical reconnection process 38", an example of which is presented in and discussed with reference to FIG. 4B. A first exemplary step 54 of physical reconnection process 38" involves the user logging into the utility application using his or her user identification information and corresponding password information. Upon proper input of this or other access information, a user can then request a load reconnect in step 56. The user is also preferably provided with the option to specify a threshold limit for energy consumption. Examples of such a threshold limit could correspond to the amount of either daily or monthly energy usage or energy demand. Upon exceeding the user-defined threshold, the system then preferably sends the user an alarm notification (such as an e-mail) to notify the customer of such an occurrence. The utility network then performs an on-request read of the metering equipment in step 58 to monitor the selected load and verify the current load reading before reconnecting the meter. The next step 60 corresponds to the actual reconnection, and a reconnect signal is sent to the end-point device at the selected utility load, similar to sending a disconnection signal 48.

Once the end-point device receives the reconnect signal, its connection element is toggled to a connected status. Immediately upon (re)connection, the remote system performs a series of rapid data reads in step 62 to ensure that potential voltage surges do not destroy any components of the meter system. The utility system monitors the load and rapidly reads the meter data corresponding to instantaneous energy consumption to look for abnormal or excessive consumption rates. If any such dangerous consumption readings that may harm or destroy meter components are detected, the customer load will be disconnected from service. Other equivalent procedures may be utilized to provide similar safeguards for the utility system. Step 62 also serves to verify that the selected utility load was indeed connected. Daily reads and corresponding reports are maintained in step 64 to generate information and verify proper operation of the load.

A service similar to the remote physical connection service 38 offered by utility application 10 is a remote virtual connection service 40. Virtual connection service 40 may be available to customers of many types of utilities, such as those previously presented as examples, and particularly related to gas, water, and electric commodities. Its application is not limited to electric utilities since the same hazards do not exist without actual physical connection and disconnection of the utility.

A flow chart of exemplary steps corresponding to such a virtual connection service 40 is presented as FIG. 5. Security access information may be required for a user to utilize this service. As such, a user preferable logs into the web-based system in step 65 by inputting his or her identification information and corresponding password information. A subsequent step 66 in the exemplary virtual connection service is for a user to set threshold levels for daily energy consumption and/or demand. The desired threshold amount is inputted by a user to the web-based utility application 10. In the next step 68, the user selects the meters to virtually disconnect. The system preferably performs an on-request read of the metering hardware monitoring the load to verify the current consumption reading. That value is stored in web-based application 10 or an interfaced database thereof. Subsequent daily reads of the metering equipment monitoring the load are performed to verify that the consumption and/or demand thresholds have not been exceeded. Daily reports such as those described with respect to service 26 are also generated regarding the status of selected end-point devices in the utility network. Once the selected load(s) exceed the energy threshold set by the user, the system notifies the user in step 72 with an alarm. This process is similar to the usage notification service 28, and also sends an e-mail or other communicated message to the user signaling that the threshold has been exceeded. A final exemplary step 74 in the virtual connection process is to perform another on-request read of the meter equipment to verify that the meter is virtually reconnected.

A safeguard that may preferably be incorporated into the subject interactive system is a feature that will prompt users to verify most of the steps associated with selected remote utility services. It is especially preferred to adopt a supplemental verification process for any remote disconnection or reconnection service. An example of such a verification process may be a telephone call to the end-point user to provide notification of a connection or disconnection operation.

One of the general advantages of the system presented herein is that it increases the efficiency, economy, security and reliability of current methods available for servicing a utility loads and corresponding metering equipment. However, it may be difficult to ensure 100% effective operation of any remote automated system, especially an automated utility system with such an extensive network of components. Thus, it should be appreciated that a backup system is established for incidents that may require special attention. For instance, if a meter status cannot be verified or a specific component malfunctions, then a trouble ticket may be created to alert a utility field technician to personally visit the component location and service the component as required.

There are several unique services that are offered in the exemplary utility service described above in accordance with the presently disclosed technology. It should be appreciated that other exemplary embodiments of an interactive utility system could comprise varied selected combinations of such services, features and components, without departing from the spirit and scope of the claimed subject matter. It should also be appreciated that the subject matter as described with respect to a level of energy consumption could be applied to levels of daily, weekly, monthly, or yearly amounts of energy consumption, or energy consumption defined over any other established period of time.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An interactive system for managing customer utility loads, comprising:
    a plurality of utility meters for monitoring the distribution of a product at respective said customer utility loads;
    a web-based application that offers a plurality of services to a user, wherein selected of said services provide data corresponding to product distribution at selected of said customer utility loads, wherein said plurality of services comprises:
        a read service to remotely read metered data corresponding to selected of said customer utility loads and subsequently display data reports corresponding to said metered data; and
        a usage notification service wherein a user inputs threshold amounts of utility consumption, utility demand, or combinations thereof, and receives a notification when selected of said customer utility loads exceeds said threshold amounts;

a control network linked to said web-based application for managing the interaction of selected elements of said system and for storing various system-related data; and a communications network linking said control network to said utility meters and for relaying communications signals.

2. An interactive system as in claim 1, wherein said plurality of services further comprises a connection service for effecting the connection status of said customer utility load, wherein said connection status is connected or disconnected.

3. An interactive system as in claim 2, wherein access to said web-based application is effected upon a user inputting an identification element and a corresponding password element.

4. An interactive system as in claim 1, wherein said plurality of services comprises a connection service for effecting the connection status of said customer utility load, wherein said connection status is connected or disconnected.

5. An interactive system as in claim 4, wherein said connection status is established by a switch element located on the load side of each said utility meter.

6. An interactive system as in claim 5, wherein said switch element is a circuit breaker.

7. An interactive system as in claim 6, wherein said circuit breaker is capable of limiting currents up to about 200 Amperes.

8. An interactive system as in claim 1, wherein each of said utility meters comprises a communications component capable of transmitting and receiving radio frequency (RF) signals among said communications network.

9. An interactive system as in claim 1, wherein said product distribution comprises utility commodities selected from the group comprising water, gas, and electricity.

10. An interactive utility system for monitoring and effecting the distribution of a utility product to a plurality of utility loads, said interactive system comprising:

a plurality of utility meters provided in conjunction with an arrangement for measuring or distributing said utility product, wherein each of said utility meters incorporates a radio frequency (RF) communications device for relaying selected utility information;

a web-based platform providing selectable services to a user, wherein said selectable services comprise:
  (i) gathering and displaying data that corresponds to information gathered by selected of said utility meters;
  (ii) disconnecting or reconnecting product flow to selected of said utility loads; and
  (iii) a usage notification service wherein a user inputs threshold amounts of utility consumption, utility demand, or combinations thereof, and receives a notification when selected of said customer utility loads exceeds said threshold amounts;

a communications network established among each of said utility meters and a system controller, for passing signaled information between selected of said utility meters and said system controller, and through any intermediate communication nodes thereof; and a control network for managing the operation of said interactive utility system, wherein said control network is linked to said web-based platform.

11. An interactive utility system as in claim 10, wherein access to said web-based platform is effected upon a user inputting an identification element and a corresponding password element.

12. An interactive utility system as in claim 10, wherein said control network comprises databases for storing meter data corresponding to selected of said customer utility loads and for storing system information for said web-based platform.

13. An interactive utility system as in claim 10, wherein said utility product corresponds to electricity.

14. An interactive utility system as in claim 13, wherein said selectable service of disconnecting or reconnecting electricity flow can correspond to either physically disconnecting or reconnecting or virtually disconnecting or reconnecting the flow of electricity.

15. An interactive utility system as in claim 14, wherein said process of physically disconnecting or reconnecting said flow of electricity is effected by remotely toggling a connection element.

16. An interactive utility system as in claim 15, wherein said connection element corresponds to a circuit breaker capable of limiting currents up to about 200 Amperes.

17. A remote system for disconnecting and reconnecting the flow of electricity at a customer utility load, comprising:

a metering system corresponding to said customer utility load for monitoring the status of and providing consumption data corresponding to said customer utility load;

a connection element provided in conjunction with said metering system for toggling between connected or disconnected status of the electricity flow;

a web-based application for remotely controlling status of the electricity flow, wherein said status is characterized as either connected or disconnected, wherein said web-based application comprises a service for:
  connecting the electricity flow by remotely toggling the connection element to connected status;
  performing a series of rapid data reads to verify the connection status and to monitor instantaneous energy consumptiom; and
  disconnecting the electricity flow by remotely toggling the connection element to disconnected status when the instantaneous energy consumption is above a predefined threshold; and a radio frequency (RF) communications device provided in conjunction with said metering system for relaying information between said metering system and said web-based application.

18. A remote system as in claim 17, wherein said metering system comprises a solid-state electronic utility meter for measuring the flow of electricity at said customer utility load.

19. A remote system as in claim 17, wherein said web-based application farther comprises a remote read service for remotely collecting meter data after said connection element is toggled to disconnected status, thus ensuring that the disconnected status of the connection element.

20. A remote system as in claim 17, wherein access to said web-based application is effected upon a user entering an identification element and a corresponding password element.

21. A remote system as in claim 17, wherein said connection element comprises a circuit breaker capable of limiting currents up to about 200 Amperes.

22. A remote system as in claim 17, further comprising a control network linked to said web-based application and to said metering system for managing the operation of and communication among selected components of said remote system and for storing various system-related data.

23. A remote system as in claim 17, wherein said web-based application comprises a disconnection service for establishing a usage threshold amount that corresponds to a limit for the amount of demand energy at a selected customer utility load, for monitoring the amount of energy demand at said selected customer utility load, and for toggling said connection element to disconnection status when the amount of demand energy at selected said customer utility load exceeds said usage threshold amount.

* * * * *

(12) EX PARTE REEXAMINATION CERTIFICATE (8156th)
United States Patent
Booth et al.

(10) Number: US 7,561,681 C1
(45) Certificate Issued: Apr. 12, 2011

(54) INTERACTIVE SYSTEM FOR MANAGING AND REMOTELY CONNECTING CUSTOMER UTILITY LOADS

(75) Inventors: Derek Booth, Suwanee, GA (US); Ivo Steklac, Highlands Ranch, CO (US)

(73) Assignee: Cellnet Group, Inc., Alpharetta, GA (US)

Reexamination Request:
No. 90/009,757, Jun. 4, 2010

Reexamination Certificate for:
Patent No.: 7,561,681
Issued: Jul. 14, 2009
Appl. No.: 11/104,155
Filed: Apr. 12, 2005

Related U.S. Application Data

(63) Continuation of application No. 09/966,326, filed on Sep. 28, 2001, now abandoned.

(51) Int. Cl.
*H04M 11/00* (2006.01)

(52) U.S. Cl. .................. 379/106.03; 379/106.01; 379/102.01; 379/102.02

(58) Field of Classification Search .................. None
See application file for complete search history.

(56) References Cited

U.S. PATENT DOCUMENTS

| | | | |
|---|---|---|---|
| 5,699,276 A | 12/1997 | Roos | |
| 6,018,726 A | 1/2000 | Tsumura | |
| 6,122,603 A | 9/2000 | Budike, Jr. | |
| 6,219,409 B1 | 4/2001 | Smith et al. | |

FOREIGN PATENT DOCUMENTS

| | | |
|---|---|---|
| DE | 100 09 109 A1 | 8/2001 |
| WO | WO 01/06612 A | 1/2001 |
| WO | WO 01/69484 | 9/2001 |
| WO | WO 01/71881 A2 | 9/2001 |

OTHER PUBLICATIONS

"International Preliminary Examination Report", PCT Application No. PCT/US02/13112, Jul. 5, 2004.
"Notification of Transmittal of International Search Report", PCT Application No. PCT/US02/13112, Aug. 1, 2002.
"Office Action issued by Canadian Patent Office", Canada Patent Application No. 2,465,941, Aug. 13, 2009.
"Supplemental European Patent Search Report;" European Patent Application No. 02725814.4, Apr. 5, 2006.

*Primary Examiner*—Alexander J Kosowski

(57) ABSTRACT

An interactive system for managing and remotely monitoring and effecting the connection status of a customer utility load network is disclosed. Preferred embodiments of the interactive system are utilized for customer loads that correspond to the distribution of electrical energy. The interactive system is preferably provided through a web-based application that offers a plurality of selectable services to a user. Security information is preferably required for a user to gain access to the system. Services provided may comprise a read service for providing metered customer utility data, a usage and/or demand notification service for alarming a user when utility usage and/or demand exceeds a defined threshold amount, and/or a connection service for setting a utility load as either connected or disconnected. A control system is preferably provided in conjunction with the web-based application to interface the application to other components involved in the interactive system. Such a control system preferably comprises at least a system controller for managing all nodes in the utility network and a database system for storing meter data and other system-related information. A wireless communications network is established for relaying information from the system controller and web-based utility application to any utility meters or other components linked to the system.

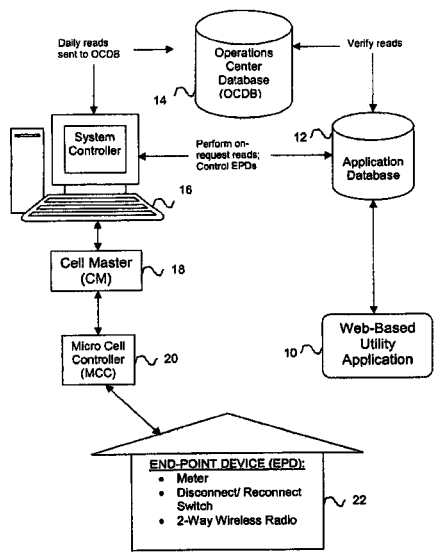

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10-23 is confirmed.

Claim 1 is cancelled.

Claims 2-4 and 8-9 are determined to be patentable as amended.

Claims 5-7, dependent on an amended claim, are determined to be patentable.

2. [An interactive system as in claim 1.] *An interactive system for managing customer utility loads, comprising:*
   *a plurality of utility meters for monitoring the distribution of a product at respective said customer utility loads;*
   *a web-based application that offers a plurality of services to a user, wherein selected of said services provide data corresponding to product distribution at selected of said customer utility loads, wherein said plurality of services comprises:*
   *a read service to remotely read metered data corresponding to selected of said customer utility loads and subsequently display data reports corresponding to said metered data; and*
   *a usage notification service wherein a user inputs threshold amounts of utility consumption, utility demand, or combinations thereof, and receives a notification when selected of said customer utility loads exceeds said threshold amounts;*
   *a control network linked to said web-based application for managing the interaction of selected elements of said system and for storing various system-related data; and*
   *a communications network linking said control network to said utility meters and for relaying communications signals,*
   wherein said plurality of services further comprises a connection service for effecting the connection status of said customer utility load, wherein said connection status is connected or disconnected.

3. An interactive system as in claim [1] *2*, wherein access to said web-based application is effected upon a user inputting an identification element and a corresponding password element.

4. An interactive system as in claim [1] *2*, wherein said plurality of services comprises a connection service for effecting the connection status of said customer utility load, wherein said connection status is connected or disconnected.

8. An interactive system as in claim [1] *2*, wherein each of said utility meters comprises a communications component capable of transmitting and receiving radio frequency (RF) signals among said communications network.

9. An interactive system as in claim [1] *2*, wherein said product distribution comprises utility commodities selected from the group comprising water, gas, and electricity.

* * * * *